(12) United States Patent
Huang et al.

(10) Patent No.: US 12,101,508 B2
(45) Date of Patent: Sep. 24, 2024

(54) VOLUMETRIC MEDIA PROCESS METHODS AND APPARATUS

(71) Applicant: ZTE Corporation, Guangdong (CN)

(72) Inventors: Cheng Huang, Guangdong (CN); Yaxian Bai, Guangdong (CN)

(73) Assignee: ZTE Corporation, Guangdong (CN)

( * ) Notice: Subject to any disclaimer, the term of this patent is extended or adjusted under 35 U.S.C. 154(b) by 50 days.

(21) Appl. No.: 17/814,762

(22) Filed: Jul. 25, 2022

(65) Prior Publication Data

US 2022/0360819 A1    Nov. 10, 2022

Related U.S. Application Data

(63) Continuation of application No. PCT/CN2020/084837, filed on Apr. 15, 2020.

(51) Int. Cl.
| | |
|---|---|
| H04N 19/597 | (2014.01) |
| G06T 15/08 | (2011.01) |
| G06T 15/20 | (2011.01) |
| H04N 19/70 | (2014.01) |

(52) U.S. Cl.
CPC .......... *H04N 19/597* (2014.11); *G06T 15/08* (2013.01); *G06T 15/20* (2013.01); *H04N 19/70* (2014.11)

(58) Field of Classification Search
CPC .... H04N 19/597; H04N 19/70; H04N 13/194; H04N 13/388; H04N 19/61; H04N 19/11; H04N 19/12; H04N 19/132; H04N 19/159; H04N 19/172; H04N 19/176; H04N 19/463; G06T 15/08; G06T 15/20
USPC .................................................. 375/240, 40
See application file for complete search history.

(56) References Cited

U.S. PATENT DOCUMENTS

| | | | | |
|---|---|---|---|---|
| 11,196,977 | B2* | 12/2021 | Graziosi | ................ G06T 9/001 |
| 11,523,135 | B2* | 12/2022 | Aflaki Beni | ......... H04N 19/167 |
| 2018/0041764 | A1 | 2/2018 | Lin et al. | |
| 2019/0080183 | A1 | 3/2019 | Li et al. | |
| 2019/0318488 | A1* | 10/2019 | Lim | ................ H04N 21/85406 |

(Continued)

FOREIGN PATENT DOCUMENTS

| | | |
|---|---|---|
| CN | 108282635 A | 7/2018 |
| CN | 109391827 A | 2/2019 |

(Continued)

OTHER PUBLICATIONS

International Search Report and Written Opinion International Application No. PCT/CN2020/084837, mailed on Jan. 14, 2021 (6 pages).
Co-Pending JP Application No. 2022-546009, Office Action dated Nov. 24, 2023 26 pages with unofficial English Summary.
Co-Pending EP Application No. 20896941.0, Extended Search Report dated Jan. 31, 2023, 8 pages.

(Continued)

*Primary Examiner* — Susan E. Torgerson
(74) *Attorney, Agent, or Firm* — Perkins Coie LLP

(57) ABSTRACT

Methods and apparatus for processing of volumetric visual data are described. One example method includes decoding, by a decoder, a bitstream containing volumetric visual information for a 3-dimensional scene that is represented as one or more atlas sub-bitstreams and one or more encoded video sub-bitstreams, reconstructing, using a result of decoding the one or more atlas sub-bitstreams and a result of decoding the one or more encoded video sub-bitstreams, the 3-dimensional scene, and rendering a target view of the 3-dimensional scene based on a desired viewing position and/or a desired viewing orientation.

20 Claims, 8 Drawing Sheets

(56) References Cited

U.S. PATENT DOCUMENTS

| | | | |
|---|---|---|---|
| 2019/0320164 A1* | 10/2019 | Salahieh | H04N 13/156 |
| 2020/0014940 A1* | 1/2020 | Dawar | G06T 9/001 |
| 2022/0078486 A1* | 3/2022 | Hannuksela | H04N 21/2393 |
| 2022/0141487 A1* | 5/2022 | Oh | G06T 9/00 |
| | | | 375/240.08 |

FOREIGN PATENT DOCUMENTS

| | | |
|---|---|---|
| CN | 109509260 A | 3/2019 |
| WO | 2020/013976 | 1/2020 |
| WO | 2020/071112 | 4/2020 |

OTHER PUBLICATIONS

Intel "Signaling of Enable Views Per Atlas" ISO/IEC JTC1/SC29/WG11 MPEG2019/M53042-v3 Apr. 2020, Alpbach, Austria, ISO/IEC JTC1/SC29/WG11 6 pages.

Boyce, "Working Draft 4 of Immersive Video", Feb. 28, 2020, ISO /IEC JTC 1/SC 29 /WG 11, 71 pages.

"Motion Picture Expert Group Draft Text of ISO/IEC Dis 23090-10 Carriage of Video-based Point Cloud Compression Data" ISO/IEC JTC 1/SC 29/WG 11 Coding of moving pictures and audio, 2020-02-32, 46 pages.

Co-Pending JP Application No. 2022-546009, Penultimate Office Action dated May 1, 2024 5 pages with unofficial English Summary.

\* cited by examiner

VOLUMETRIC MEDIA PROCESS METHODS AND APPARATUS

CROSS-REFERENCE TO RELATED APPLICATION

This application is a continuation and claims priority to International Application No. PCT/CN2020/084837, filed on Apr. 15, 2020, the disclosure of which is hereby incorporated by reference herein in its entirety.

TECHNICAL FIELD

This patent document is directed to volumetric visual media processing and transmission technologies.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding and decoding digital video that carries visual information related to volumetric visual media. In one example aspect, a method of volumetric visual data processing is disclosed. The method includes decoding, by a decoder, a bitstream containing volumetric visual information for a 3-dimensional scene that is represented as one or more atlas sub-bitstreams and one or more encoded video sub-bitstreams, reconstructing, using a result of decoding the one or more atlas sub-bitstreams and a result of decoding the one or more encoded video sub-bitstreams, the 3-dimensional scene, and rendering a target view of the 3-dimensional scene based on a desired viewing position and/or a desired viewing orientation.

In another example aspect, a method for generating a bitstream comprising volumetric visual data is disclosed. The method includes generating, by an encoder, a bitstream containing volumetric visual information for a 3-dimensional scene by representing using one or more atlas sub-bitstreams and one or more encoded video sub-bitstreams and including, in the bitstream, information enabling rendering of a target view of the 3-dimensional scene based on a desired viewing position and/or a desired viewing orientation.

In another example aspect, an apparatus for implementing one or more of the above-described methods is disclosed. The apparatus may include a processor configured to implement the described encoding or decoding methods.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
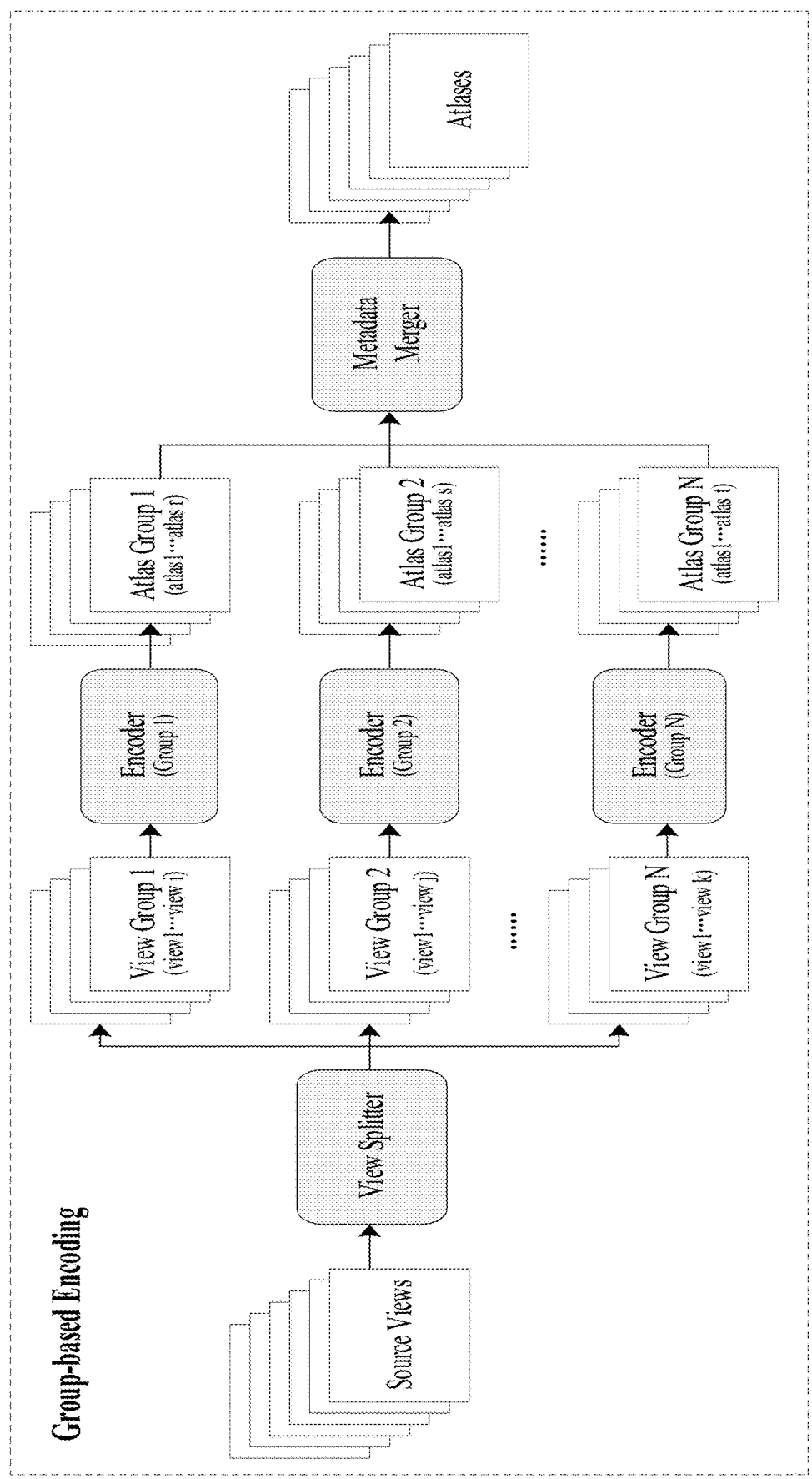
FIG. 1 shows an example process flow of group-based encoding for atlases generation.

Section headings are used in the present document only to improve readability and do not limit scope of the disclosed embodiments and techniques in each section to only that section. Certain features are described using the example of the H.264/AVC and H.265/HEVC, MPEG and MPEG-DASH standards. However, applicability of the disclosed techniques is not limited only to these standards.

In the present document, various syntax elements are disclosed in different sections for point cloud data processing. However, it is understood that a syntax element with same name will have a same format and syntax as used in different sections, unless otherwise noted. Furthermore, the different syntax elements and structures described under different section headings may be combined together in various embodiments. In addition, while the specific structures are described as implementation examples, it will be understood that the order of various entries of syntax structures may be changed, unless otherwise noted in the present document.

1. Brief Discussion

Traditionally, capture, processing, storage and presentation of digital visual media such as images and video, uses two-dimensional frame-based capture of a visual scene. In the last few years, there has been a growing interest to extend user experience to three-dimensions. Various industry standards have begun addressing issues related to capture, carriage, and presentation of 3-D visual scenes. Notably, one set of techniques uses the traditional frame-based (2-D) video encoding tools to encode 3D visual information by projecting 3D information on 2-D planes.

Two notable techniques include the use of video-based point cloud compression (V-PCC) and Moving Pictures Experts Group (MPEG) Immersive Video (MIV) initiative.

1.1 Video-Based Point Cloud Compression (V-PCC)

The Video-based point cloud compression (V-PCC) represents a volumetric encoding of point cloud visual information and enables efficient capturing, compression, reconstruction, and rendering of point cloud data by utilizing MPEG video codecs, such as AVC, HEVC and VVC. A V-PCC bitstream, containing coded point cloud sequence (CPCS), is composed of VPCC units carrying sequence parameter set (SPS) data, an atlas information bitstream, a 2D video encoded occupancy map bitstream, a 2D video encoded geometry bitstream, and zero or more 2D video encoded attribute bitstreams. Each V-PCC unit has a V-PCC unit header, which describes the type of the V-PCC unit, and a V-PCC unit payload. The payload of occupancy, geometry, and attribute V-PCC units correspond to video data units (e.g., HEVC NAL units) that could be decoded by the video decoder specified in the corresponding occupancy, geometry, and attribute parameter set V-PCC unit.

1.2 Carriage of V-PCC in ISOBMFF

V-PCC units in a V-PCC elementary stream are mapped to individual tracks within the ISOBMFF file based on their types. There are two types of tracks in a multi-track ISOBMFF V-PCC container: V-PCC track and V-PCC component track. ISOBMFF is a popular file format for representation of multiple tracks of digital video and audio information.

The V-PCC track is a track carrying the volumetric visual information in the V-PCC bitstream, which includes the patch information sub-bitstream and the sequence parameter sets. V-PCC component tracks are restricted video scheme tracks which carry 2D video encoded data for the occupancy map, geometry, and attribute sub-bitstreams of the V-PCC bitstream. Based on this layout, a V-PCC ISOBMFF container shall include the following:

A V-PCC track which contains sequence parameter sets (in the sample entry) and samples carrying the payloads of the sequence parameter set V-PCC unit (unit type VPCC_VPS) and atlas V-PCC units (unit type VPCC_AD). This track also includes track references to other tracks carrying the payloads of video compressed V-PCC units (i.e., unit types VPCC_OVD, VPCC_GVD, and VPCC_AVD).

A restricted video scheme track where the samples contain access units of a video-coded elementary stream for occupancy map data (i.e., payloads of V-PCC units of type VPCC_OVD).

One or more restricted video scheme tracks where the samples contain access units of video-coded elementary streams for geometry data (i.e., payloads of V-PCC units of type VPCC_GVD).

Zero or more restricted video scheme tracks where the samples contain access units of video-coded elementary streams for attribute data (i.e., payloads of V-PCC units of type VPCC_AVD).

1.3 MPEG Immersive Video (MIV)

MPEG is developing the International Standard (ISO/IEC 23090-12), i.e. MPEG Immersive Video (MIV) to support the compression of immersive video content, in which a real or virtual 3-D scene is captured by multiple real or virtual cameras. The MIV content provides support for playback of a three-dimensional (3D) scene within a limited range of viewing positions and orientations, with 6 Degrees of Freedom (6DoF).

While MIV and V-PCC techniques aim to offer similar end user experience of being able to view 3-D scenes and objects, there are several differences in the approaches taken by these solutions. For example, MIV is expected to provide a view-based access to 3-D volumetric visual data, while V-PCC provides a projection-based access to 3-D volumetric visual data. Accordingly, MIV is expected to offer a user experience that is more realistic, user-controlled and will provide a much higher immersive experience to a viewer. However, it would still be beneficial to use some of the existing bitstream syntax and file format information available in V-PCC to ensure quick and compatible adoption of MIV.

2. Example Issues Considered on the Encoder Side

On the encoder side of MIV, the view representation is 2D sample arrays of at least a depth/occupancy component, and with optional texture and entity components, representing the projection of a 3D scene onto a surface using view parameters. View parameters define the projection used to generate a view representation from a 3D scene, including intrinsic and extrinsic parameters. In this context, the source view indicates source video material before encoding that corresponds to the format of a view representation, which may have been acquired by capture of a 3D scene by a real camera or by projection by a virtual camera onto a surface using source camera parameters.

2.1 Group-Based Encoder

The group-based encoder is the MIV top-level encoder which splits the views into multiple view groups and encodes each of the view groups independently using multiple single-group encoders. The source views are distributed in multiple single group encoders, each has view optimizer which labels the source views as basic views or additional views and atlas constructor which takes as input the basic and additional views, along with their parameters and outputs atlases and associated parameters.

MPEG video codecs, such as HEVC (High Efficiency Video Coding) encoder will be used to encode the texture and depth of the atlases. The resulting attribute and geometry video streams will be multiplexed along with the MIV metadata forming the final MIV bitstream.

3. Example Issues Considered on the Decoder Side

The MIV decoder handles the parsing and decoding of MIV bitstream to output decoded geometry pictures, texture attribute pictures and the MIV metadata frame-by-frame.

For the rendering part of MIV decoder, the MIV rendering engine reconstructs a geometry frame at nominal atlas resolution, then converts a sample of the decoded geometry frame upscaled at nominal atlas resolution to a floating-point depth value in meters. The output of the MIV decoder is a perspective viewport or omnidirectional view according to a desired viewing pose, enabling motion parallax cues within a limited space. For this, the MIV rendering engine fulfills the reconstruction of reconstructed views and the projection pixels of reconstructed view to viewport.

In a V-PCC based representation of 3-D scenes, a fixed number of projections of 3-D visual media are represented in a bitstream. For example, six projections corresponding to 6 surfaces of a bounding box may be converted into a 2-D visual image and encoded using a traditional video codec technology. However, V-PCC is unable to support a user experience in which user desires to watch a 3-D scene from different viewpoints, rather than watching a finite number of projections of the 3-D scenes. In such a viewpoint based rendering of volumetric video data, therefore, it is not currently known how to represent such visual data at the bitstream level (e.g., bits representative of the actual scene), or at a file level (e.g., organization of media data into logical file groups) or at a system level (e.g., transport and metadata level) that allows an encoder to build a bitstream representing 3-D volumetric data in such a manner that a renderer at a decoder is able to parse through the bitstream and retrieve media data based on a desired viewpoint for a user.

Furthermore, it is not known how the current organization of V-PCC tracks can be extended to accommodate the use of multiple views in MIV. For example, how to do a mapping between V-PCC tracks, and desired views for rendering a 3-D scene is not known. For example, an MIV implementation may use 10 or 40 or even 100 different views that may be encoded in a bitstream. It is currently not known how to signal the different views using a track structure such that a decoder or a renderer is able to parse the system layer of a bitstream to locate the desired video or image track and render a view for a desired position or a viewpoint of a viewer.

Various embodiments are disclosed in the present document to solve the above problem, and others. For example, as further described throughout the present document, solutions are provided to enable encoding and decoding of multiple views in view groups and using one or more sub-stream for atlases, as further described in the present document.

3.1 Group-Based Renderer

The group-based renderer is capable of rendering from local patches within each atlas group separately. The renderer's process is composed of group selection stage, multiple passes each running the synthesizer with different set of atlases and output a synthesized intermediate view, and the merging stage to combine all intermediate synthesized views into a final desired viewport, e.g., a Target View which indicates either perspective viewport or omnidirectional view at the desired viewing position and orientation.

3.2 Carriage of V-PCC Data with Multiple Atlases

Despite the differences in the intended applications, input data format and rendering, Video-based point cloud compression (V-PCC) and MPEG Immersive Video (MIV) share the same core tools to represent information in the encoded domain, i.e. split of 3D space data into 2D patch maps and encoded as 2D atlas frames. So, the V-PCC elementary bitstream may contain more than one atlas to carry MIV content.

In order to support the efficient access, delivery and rendering of volumetric visual media compressed as MPEG Immersive Video defined in ISO/IEC 23090-12 in a 6DOF environment, there is a need to specify the storage format of V-PCC bitstream with multiple atlases.

3.3 Example File Formats

In general, embodiments based on the disclosed technique may be used for video data processing. In some embodiments, omnidirectional video data is stored in a file based on an ISO (International Organization for Standardization) basic media file format. Among them, the ISO basic media file format such as the restricted scheme information box, the track reference box, and the track group box can refer to the ISO/IEC JTC1/SC29/WG11 Moving Picture Experts Group (MPEG) MPEG-4. Part 12 ISO Base Media File Format to operate.

All the data in the ISO basic file format is installed in a box. The ISO basic file format represented by an MP4 file is composed of several boxes, each of which has a type and a length and can be regarded as a data object. A box can contain another box called a container box. An MP4 file will first have only one "ftyp" type of box, as a markup of the file format and contain some information about the file. There will be and only one "MOOV" type of box (Movie Box), which is a container box whose subbox contains metadata information for the media. The media data of the MP4 file is included in the "mdat" type of media box (Media Data Box), which is also a container box, which may or may not be available (when the media data refers to other files), the structure of the media data is composed of metadata.

A timed metadata track is a mechanism in the ISO Base Media File Format (ISOBMFF) that establishes timed metadata associated with a particular sample. Timed metadata is less coupled to media data and is usually "descriptive."

Each volumetric visual scene may be represented by a unique volumetric visual track. An ISOBMFF file may contain multiple scenes and therefore multiple volumetric visual tracks may be present in the file.

As previously described, in the present document, several technical solutions are provided to allow representation of a 3D or spatial region of a point cloud data, such as the V-PCC data of MPEG, into a format that is compatible with the traditional 2D video formats such as the MP4 or the ISOBMFF format. One advantageous aspect of the proposed solutions is to be able to reuse traditional 2D video techniques and syntax for implementation of the new functionality.

4. Solution 1

In some embodiments, a new syntax structure called View Group Information Structure may be encoded by encoders into the bitstream, and correspondingly decoded by decoders for rendering a desired view of a 2D scene to a display. Some example implementations of syntax structures and associated encoding and decoding techniques are described herein.

4.1 Example Embodiment 1

Example View Group Information Structure

Definition

ViewGroupInfoStruct provides the view group information of volumetric visual media such as MIV content captured and processed at the encoding stage, including at least: the view group identifier, the view group description, the number of views, the view identifier and camera parameters for each view.

Syntax

```
aligned (8) class
    ViewGroupInfoStruct (camera_parameters_included_flag) {
        unsigned int (16) view_group_id;
        String view_group_description;
        unsigned int (8) num_views;
        for (i=0; i < num_views; i++) {
            unsigned int (16) view_id;
            unsigned int (1) basic_view_flag;
            if (camera_parameters_included_flag) {
                CameraParametersStruct ( ) ;
            }
        }
    }
```

Semantics view_group_id provides the identifier for the view group.

view_group_description is null-terminated UTF-8 string that provides a textual description of the view group.

num_views specifies the number of views in the view group.

view_id provides the identifier for the given view in the view group.

basic_view_flag equal to 1 specifies that the associated view is selected as basic view. basic_view_flag equal to 0 specifies that the associated view is not selected as basic view.

camera_parameters_included_flag equal to 1 indicates that the CameraParametersStruct is present. camera_parameters_included_flag equal to 0 indicates that the CameraParametersStruct is not present.

Camera Parameters Structure

Definition

CameraParametersStruct provides the real or virtual camera position and orientation information, which can be used to render V-PCC or MIV content as either perspective or omnidirectional view at the desired viewing position and orientation.

At the decoding stage, the group-based renderer can use this information to compute the view group distance to the desired pose being synthesized for. The view weighting synthesizer can use this information to compute the distance between the view position and the target viewport position.

Syntax

```
aligned (8) class CameraParametersStruct( ) {
    unsigned int (10) camera_id;
    unsigned int (1) camera_pos_present;
    unsigned int (1) camera_ori_present;
    unsigned int (1) camera_fov_present;
    unsigned int (1) camera_depth_present;
    if (camera_pos_present) {
        signed int (32) camera_pos_x;
        signed int (32) camera_pos_y;
        signed int (32) camera_pos_z;
    }
    if (camera_ori_present) {
        signed int (32) camera_quat_x;
        signed int (32) camera_quat_y;
        signed int (32) camera_quat_z;
    }
    if (camera_fov_present) {
        unsigned int (32) camera_hor_range;
        unsigned int (32) camera_ver_range;
    }
    if (camera_depth_present) {
        unsigned int (32) camera_near_depth;
        unsigned int (32) camera_far_depth;
    }
}
``` camera_id provides an identifier for the given real or virtual camera.

camera_pos_present equal to 1 indicates that the camera position parameters are present. camera_pos_present equal to 0 indicates that the camera position parameters are not present.

camera_ori_present equal to 1 indicates that the camera orientation parameters are present. camera_ori_present equal to 0 indicates that the camera orientation parameters are not present.

camera_fov_present equal to 1 indicates that the camera field-of-view parameters are present. camera_fov_present equal to 0 indicates that the camera field-of-view parameters are not present.

camera_depth_present equal to 1 indicates that the camera depth parameters are present. camera_depth_present equal to 0 indicates that the camera depth parameters are not present.

camera_pos_x, camera_pos_y and camera_pos_z respectively indicate the x, y and z coordinates of the camera position in meters in the global reference coordinate system. The values shall be in units of $2^{-16}$ meters.

camera_quat_x, camera_quat_y and camera_quat_z indicate the x, y, and z components, respectively, of the orientation of the camera using the quaternion representation. The values shall be a floating-point value in the range of −1 to 1, inclusive. These values specify the x, y and z components, namely qX, qY and qZ, for the rotations that are applied to convert the global coordinate axes to the local coordinate axes of the camera using the quaternion representation. The fourth component of the quaternion qW is calculated as follows:

$$qW = \text{sqrt}(1-(qX^2+qY^2+qZ^2))$$

The point (w, x, y, z) represents a rotation around the axis directed by the vector (x, y, z) by an angle $2*\cos^{-1}(w)=2*\sin^{-1}(\text{sqrt}(x^{2}+y^{2}+z^{2}))$.

camera_hor_range indicates the horizontal field of view of the viewing frustum associated with the camera, in units of radians. The value shall be in the range of 0 to $2\pi$.

camera_ver_range indicates the vertical field of view of the viewing frustum associated with the camera, in units of radians. The value shall be in the range of 0 to $\pi$.

camera_near_depth and camera_far_depth indicate the near and far depths (or distances) based on the near and far planes of the viewing frustum associated with the camera. The value shall be in units of $2^{-16}$ meters.

Example of a V-PCC Parameter Track

V-PCC Parameter Track Sample Entry

Sample Entry Type: 'vpcp'

Container: SampleDescriptionBox

Mandatory: Yes

Quantity: One or more sample entries may be present

V-PCC parameter track shall use VPCCParametersSampleEntry which extends VolumetricVisualSampleEntry with a sample entry type of 'vpcp'.

A VPCC parameter track sample entry shall contain a VPCCConfigurationBox, and a VPCCUnitHeaderBox.

Syntax

```
class VPCCConfigurationBox extends Box ('vpcC') {
    VPCCDecoderConfigurationRecord ( ) VPCCConfig;
}
aligned (8) class VPCCParametersSampleEntry ( ) extends
    VolumetricVisualSampleEntry ('vpcp') {
    VPCCConfigurationBox config;
    VPCCUnitHeaderBox unit_header;
}
```

Semantics

VPCCConfigurationBox shall contain V-PCC parameter sets of multi-atlas V-PCC bitstream, i.e. V-PCC units with the vuh_unit_type equal to VPCC_VPS.

VPCCConfigurationBox shall only contain non-ACL NAL units common for all V-PCC tracks of multi-atlas V-PCC data including but not limited to NAL_ASPS, NAL_AAPS, NAL_PREFIX_SEI, or NAL_SUFFIX_SEI NAL units, as well as EOB and EOS NAL units, when present.

VPCCConfigurationBox may contain different values of NAL_AAPS atlas NAL unit for different V-PCC track group.

V-PCC Track Grouping

The group-based encoder of MIV can divide source views into multiple groups, it takes source camera parameters as input along with the number of groups as a preset to output a list of views to be included in each group.

The grouping forces the atlas constructor to output local coherent projections of important regions (e.g. belong to foreground objects or occluded regions) in the atlases leading to improvements in the subjective and objective results especially for the natural content or at high bitrate levels.

FIG. 1 depicts an example of a process flow of group-based encoding for atlases generation.

As shown in FIG. 1, at a group's encoding stage, each single-group encoder produces metadata with its own indexed atlases or views. A unique group ID is assigned per group and attached to the atlas parameters of the related group. In order to enable the renderer to interpret the metadata properly and map the patches correctly across all views, a merger renumbers atlas and view ID's per patch and merges the pruning graphs. Each basic view is carried in the atlas as a single, fully occupied patch (assuming the atlas size is equal or larger than the basic view size) or into multiple atlases (otherwise). The additional views are pruned into multiple patches which may be carried along with a basic view's patch in the same atlas if the atlas is of larger size or in separate atlas(es).

As shown in FIG. 1, all atlases generated from the same view group by the atlas constructor should be grouped together as an atlas group. For the group-based rendering, the decoder needs to decode patches within one or more atlas groups corresponding to one or more view groups from which one or more views of the volumetric visual data (e.g. MIV content) have been selected for the target view rendering.

The decoder could select the one or more views of a volumetric visual data for the target view based on one or more view group informations, as described in the example view group information structure, wherein each view group information describes one or more views, and each view group information includes camera parameters for the one or more views.

Figure 2:
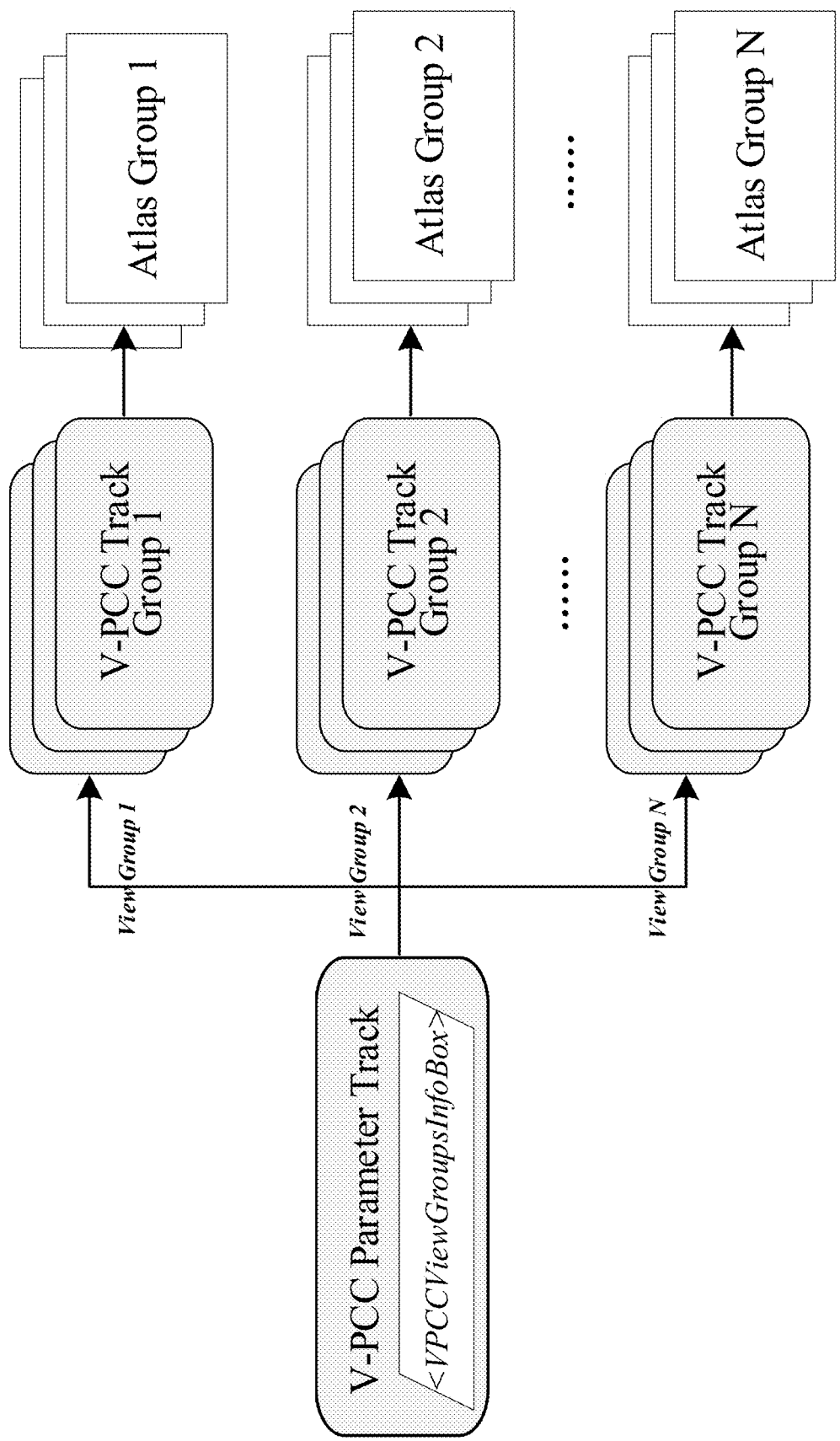
FIG. 2 shows an example of multi-track encapsulation of V-PCC bitstream with atlas groups.

FIG. 2 shows an example of multi-track encapsulation of a V-PCC bitstream with atlas groups.

As shown in FIG. 2, before the decoding of an atlas group, a file parser needs to determine and decapsulate a group of volumetric visual tracks (e.g. a V-PCC track group) corresponding to the atlas group based on a syntax element of a volumetric visual parameter track (e.g. VPCCViewGroupsBox of V-PCC parameter track) in a file storage of the bitstream; wherein the group of volumetric visual tracks and the volumetric visual parameter track carry all the atlas data for the atlas group.

A file parser can identify the volumetric visual parameter track according to a specific sample entry type. In the case of V-PCC parameter track, the sample entry type 'vpcp' should be used to identify the V-PCC parameter track and the V-PCC parameter track specifies constant parameter sets and common atlas data for all the referenced V-PCC tracks with a specific track reference.

For the storage of V-PCC bitstream with multiple atlases, all V-PCC tracks corresponding to all atlases from the same atlas group should be indicated by a track group of type 'vptg'.

Definition

TrackGroupTypeBox with track_group_type equal to 'vptg' indicates that this V-PCC track belongs to a group of V-PCC tracks that correspond to an atlas group.

V-PCC tracks belonging to the same atlas group have the same value of track_group_id for track_group_type 'vptg', and the track_group_id of tracks from one atlas group differs from the track_group_id of tracks from any other atlas group.
Syntax

```
aligned (8) class VPCCTrackGroupBox extends
trackGroupTypeBox ('vptg') {
}
```

Semantics

V-PCC tracks that have the same value of track_group_id within TrackGroupTypeBox with track_group_type equal to 'vptg' belong to the same atlas group. The track_group_id within TrackGroupTypeBox with track_group_type equal to 'vptg' is therefore used as the identifier of the atlas group.

Static View Group Information Box

Definition

Static view groups for a volumetric visual media such as MIV content and their respective associated V-PCC track groups shall be signalled in a VPCCViewGroupsBox.
Syntax

| Box Types: | 'vpvg' |
|---|---|
| Container: | VPCCParametersSampleEntry ('vpcp') |
| Mandatory: | No |
| Quantity: | Zero or one |

```
aligned (8) class VPCCViewGroupsBox extends FullBox ('vpvg', 0, 0) {
    unsigned int (16) num_view_groups;
    for (i=0; i < num_view_groups; i++) {
        ViewGroupInfoStruct (1);
        unsigned int (32) vpcc_track_group_id;
    }
}
```

Semantics num_view_groups indicates the number of view groups for the MIV content.

vpcc_track_group_id identifies the group for the V-PCC tracks which carry all the atlas data for the associated view group of the volumetric visual media such as MIV content.

Dynamic View Group Information

If the V-PCC parameter track has an associated timed-metadata track with a sample entry type 'dyvg', source view groups defined for the MIV stream carried by the V-PCC parameter track are considered as dynamic view groups (i.e., the view group information may dynamically change over time).

The associated timed-metadata track shall contain a 'cdsc' track reference to the V-PCC parameter track carrying the atlas stream.
Sample Entry

```
aligned (8) class DynamicViewGroupSampleEntry extends
MetaDataSampleEntry ('dyvg') {
    VPCCViewGroupsBox ( ) ;
}
```

Sample Format
Syntax

```
aligned (8) DynamicViewGroupSample ( ) {
    unsigned int (16) num_view_groups;
    for (i=0; i < num_view_groups; i++) {
        ViewGroupInfoStruct (camera_parameters_included_flag);
    }
}
```

Semantics num_view_groups indicates the number of view groups signalled in the sample. This may not necessarily be equal to the total number of available view groups. Only view groups whose source views are being updated are present in the sample.

ViewGroupInfoStruct( ) is defined in the previous section of Embodiment 1. If camera_parameters_included_flag is set to 0, this implies that the camera parameters of the view group have been previously signalled in a previous instance of a ViewGroupInfoStruct with the same view_group_id, either in a previous sample or in the sample entry.

4.2 Example Embodiment 2

Encapsulation and Signalling in MPEG-DASH

Each V-PCC component track shall be represented in the DASH manifest (MPD) file as a separate V-PCC component AdaptationSet. Each V-PCC track shall be represented as a separate V-PCC atlas AdaptationSet. An additional AdaptationSet for common atlas information serves as the main AdaptationSet for the V-PCC content. If a V-PCC component has multiple layers, each layer may be signalled using a separate AdapatationSet.

The main AdaptationSet shall have the @codecs attribute set to 'vpcp' and the atlas AdaptationSet shall have the @codecs attribute set to 'vpc1' while the @codecs attribute for the V-PCC components AdaptationSets, or Representations if @codecs is not signalled for the AdaptationSet element, is set based on the respective codec used for encoding the component.

The main AdaptationSet shall contain a single initialization segment at the adaptation set level. The initialization segment shall contain all sequence parameter sets and non-ACL NAL units common for all V-PCC tracks needed to initialize the V-PCC decoder, including V-PCC parameter pets of multi-atlas V-PCC bitstream, and NAL_ASPS, NAL_AAPS, NAL_PREFIX_SEI, or NAL_SUFFIX_SEI NAL units, as well as EOB and EOS NAL units, when present.

The atlas AdaptationSet shall contain a single initialization segment at the adaptation set level. The initialization segment shall contain all sequence parameter sets needed to decode the V-PCC track, including V-PCC atlas sequence parameter sets as well as other parameter sets for component sub-streams.

Media segments for the Representation of the main AdaptationSet shall contain one or more track fragments of the V-PCC parameter track. Media segments for the Representation of the atlas AdaptationSet shall contain one or more track fragments of the V-PCC track. Media segments for the Representations of component AdaptationSets shall contain one or more track fragments of the corresponding component track at the file format level.

V-PCC Preselections

A V-PCC preselection is signalled in the MPD using a PreSelection element as defined in MPEG-DASH (ISO/IEC 23009-1) with an id list for the @preselectionComponents attribute including the id of the main AdaptationSet for the point cloud followed by the ids of the atlases AdaptationSets and the ids of the AdaptationSets corresponding to the point cloud components. The @ codecs attribute for the PreSelection shall be set to 'vpcp', indicating that the PreSelection media is a video-based point cloud. The PreSelection may either be signalled using a PreSelection element within the Period element or a preselection descriptor at the adaptation set level.

V-PCC Descriptor

An EssentialProperty element with a @schemeIdUri attribute equal to "urn:mpeg:mpegI:vpcc:2019:vpc" is referred to as a VPCC descriptor. At most one VPCC descriptor may be present at the adaptation set level for the main AdaptationSet of the point cloud.

TABLE 1

Attributes for the VPCC descriptor

| Attributes for VPCC descriptor | Use | Data type | Description |
| --- | --- | --- | --- |
| vpcc:@pcId | CM | xs:string | An id for the point cloud. This attribute shall be present if multiple versions of the same point cloud are signalled in separate AdapatationSets. |
| vpcc:@viewGroupIds | CM | xs:stringVectorType | A list of space separated identifiers for the view groups. This attribute shall be present if the V-PCC content correspond to one or more view groups of the volumetric visual media. |
| vpcc:@numLayers | O | xs:unsignedByte | The number of layers for the V-PCC stream. If @numLayers is not present, the default value is 1. |
| vpcc:@numTileGroups | O | xs:unsignedByte | Number of V-PCC tile groups in the V-PCC content. If @numTileGroups is not present, the default value is 1. |

Legend:

For attributes:

M = Mandatory,

O = Optional,

OD = Optional with Default Value,

CM = Conditionally Mandatory

For elements: <minOccurs> . . . <maxOccurs> (N = unbounded)

Elements are bold; attributes are non-bold and preceded with an @.

VPCCViewGroups Descriptor

To identify the static view groups in the main Adaptationset for the V-PCC content and their respective associated V-PCC track group, a VPCCViewGroups descriptor shall be used. A VPCCViewGroups is an EssentialProperty of SupplementalProperty descriptor with the @scheme IdUri attribute equal to "urn:mpeg:mpegI:vpcc:2020:vpvg".

At most one single VPCCViewGroups descriptor shall be present at the adaptation set level or the representation level in the main AdaptationSet or at the preselection level for the point cloud content.

The @value attribute of the VPCCViewGroups descriptor shall not be present. The VPCCViewGroups descriptor shall include elements and attributes as specified in Table 2.

TABLE 2

Elements and attributes for the VPCCViewGroups descriptor

| Elements and attributes for VPCCViewGroups descriptor | Use | Data type | Description |
|---|---|---|---|
| viewGroup | 0 . . . N | vpcc:viewGroupType | An element whose elements and attributes specify the view group information for the volumetric visual media and associated V-PCC track groups. |
| viewGroup@groupId | M | xs:unsignedByte | This attribute specifies the view group identifier |
| viewGroup@numViews | M | xs:unsignedByte | This attribute specifies the number of views |
| viewGroup.view | 1 . . . N | vpcc:viewType | An element whose elements and attributes specify the view information for the volumetric visual media such as V-PCC data with multiple atlases. |
| viewGroup.view@viewId | M | xs:unsignedByte | This attribute specifies the view identifier |
| viewGroup.view@is_basic_View | O | xs:boolean | A flag indicating whether the view is selected as basic view. If not present, the default value is false. |
| viewGroup.view.cameraParameter | O | vpcc:cameraParameterType | An element whose attributes specify the real or virtual camera position and orientation information according to the view. |
| viewGroup.view.cameraParameter@cameraId | M | xs:unsignedByte | This attribute specifies the camera identifier |
| viewGroup.view.cameraParameter@camera_pos_x | M | xs:int | The x-coordinate value of the camera position in meters in the global reference coordinate system. The values shall be in units of $2^{-16}$ meters. |
| viewGroup.view.cameraParameter@camera_pos_y | M | xs:int | The y-coordinate value of the camera position in meters in the global reference coordinate system. The values shall be in units of $2^{-16}$ meters. |
| viewGroup.view.cameraParameter@camera_pos_z | M | xs:int | The z-coordinate value of the camera position in meters in the global reference coordinate system. The values shall be in units of $2^{-16}$ meters. |
| viewGroup.view.cameraParameter@camera_quat_x | M | xs:float | The x component of the orientation of the camera using the quaternion representation. |
| viewGroup.view.cameraParameter@camera_quat_y | M | xs:float | The y component of the orientation of the camera using the quaternion representation. |
| viewGroup.view.cameraParameter@camera_quat_z | M | xs:float | The z component of the orientation of the camera using the quaternion representation. |
| viewGroup.view.cameraParameter@camera_hor_range | M | omaf:HRange | The horizontal field of view of the viewing frustum associated with the camera. |
| viewGroup.view.cameraParameter@camera_ver_range | M | omaf:VRange | The vertical field of view of the viewing frustum associated with the camera. |
| viewGroup.view.cameraParameter@camera_near_depth | M | xs:int | The near depth (or distances) based on the near plane of the viewing frustum associated with the camera. The value shall be in units of $2^{-16}$ meters. |
| viewGroup.view.cameraParameter@camera_far_depth | M | xs:int | The far depth (or distances) based on the far plane of the viewing frustum associated with the camera. The value shall be in units of $2^{-16}$ meters. |
| viewGroup@vpccTrackGroupId | O | xs:unsignedByte | This attribute specifies the track_group_id for the group of the V-PCC tracks which carry all the atlas data for the associated view group. |

Legend:

For attributes:

M = Mandatory,

O = Optional,

OD = Optional with Default Value,

CM = Conditionally Mandatory.

For elements: <minOccurs> . . . <maxOccurs> (N = unbounded)

Elements are bold; attributes are non-bold and preceded with an @.

Dynamic View Groups

When the view groups are dynamic, a timed-metadata track for signalling the view information of each view group in the presentation timeline shall be carried in a separate AdaptationSet with a single representation and associated (linked) with the main V-PCC track using the @association Id attribute, defined in ISO/IEC 23009-1 [MPEG-DASH], with a @associationType value that includes the 4CC 'vpcm' for the corresponding AdaptationSet or Representation.

5. Solution 2

5.1 Example Embodiment 3

Example View Information Structure

Definition

ViewInfoStruct provides the view information of MIV content captured and processed at the encoding stage, including at least: the view identifier, the identifier of view group it belongs to, the view description, and camera parameters of the view.
Syntax

```
aligned (8) class ViewInfoStruct (camera_parameters_included_flag) {
    unsigned int (16) view_id;
        unsigned int (16) view_group_id;
        String view_description;
        unsigned int (1) basic_view_flag;
        if (camera_parameters_included_flag) {
            CameraParametersStruct ( );
        }
}
```

Semantics view_id provides the identifier for the view.

view_group_id provides the identifier for the view group it belongs to.

view_descritption is null-terminated UTF-8 string that provides a textual description of the view.

basic_view_flag equal to 1 specifies that the associated view is selected as basic view. basic_view_flag equal to 0 specifies that the associated view is not selected as basic view.

camera_parameters_included_flag equal to 1 indicates that the CameraParametersStruct is present. camera_parameters_included_flag equal to 0 indicates that the CameraParametersStruct is not present.

CameraParametersStruct ( ) is defined in the previous section of Embodiment 1.
Static View Information Box FIG. 3 shows an example of multi-track encapsulation of V-PCC bitstream with multiple atlases.

For the target view rendering, the decoder needs to decode patches within one or more atlases corresponding to one or more views of the volumetric visual data (e.g. MIV content) have been selected for the target view rendering.

The decoder could select the one or more views of a volumetric visual data for the target view based on view information for the one or more views, as described in the example view information structure, wherein each view information describes camera parameters of a corresponding view.

Figure 3:
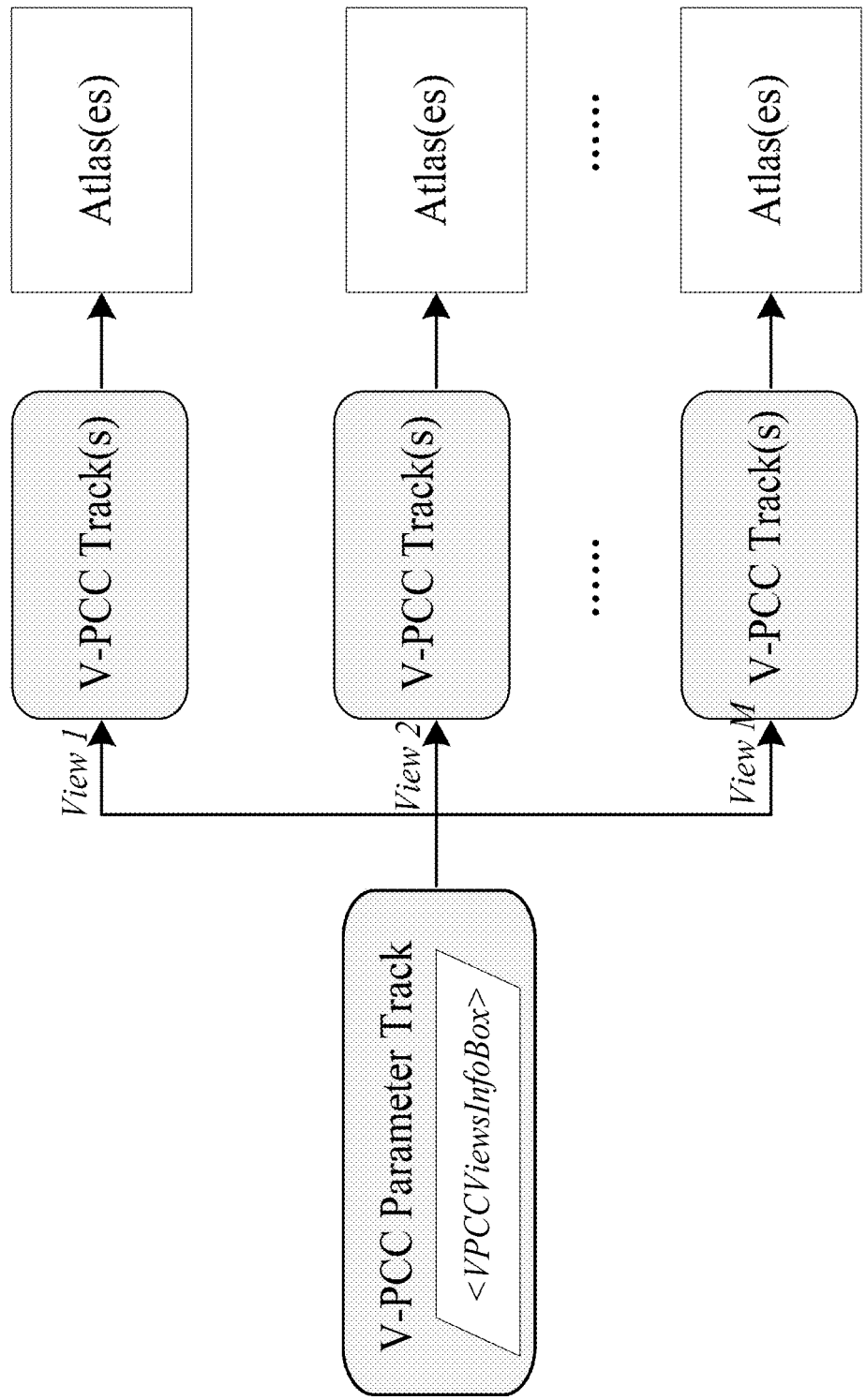
FIG. 3 shows an example of multi-track encapsulation of V-PCC bitstream with multiple atlases.

As shown in FIG. 3, before the decoding of one or more atlases, a file parser needs to determine and decapsulate one or more volumetric visual tracks (e.g. a V-PCC tracks) corresponding to the one or more atlases based on a syntax element of a volumetric visual parameter track (e.g. VPCCViewsBox of V-PCC parameter track) in a file storage of the bitstream; wherein the one or more volumetric visual tracks and the volumetric visual parameter track carry all the atlas data for the atlases.

A file parser can identify the volumetric visual parameter track according to a specific sample entry type. In the case of V-PCC parameter track, the sample entry type 'vpcp' should be used to identify the V-PCC parameter track and the V-PCC parameter track specifies constant parameter sets and common atlas data for all the referenced V-PCC tracks with a specific track reference.

Definition

The source view of a MIV content and its respective associated atlases shall be signalled in a VPCCViewsBox.
Syntax

| Box Types: | 'vpvw' |
|---|---|
| Container: | VPCCParametersSampleEntry ('vpcp') |
| Mandatory: | No |
| Quantity: | Zero or one |

```
aligned (8) class VPCCViewsBox extends FullBox ('vpvw', 0, 0) {
    unsigned int (16) num_views;
    for (i=0; i < num_views; i++) {
        ViewinfoStruct (1);
        unsigned int (8) num_vpcc_tracks;
        for (j=0; j < num_vpcc_tracks; j++) {
            unsigned int (32) vpcc_track_id;
        }
    }
}
```

Semantics num_views indicates the number of source views in the MIV content.

num_vpcc_tracks indicates the number of V-PCC tracks associated with a source view.

vpcc_track_id identifies the V-PCC track which carries the atlas data for the associated source view.
Dynamic View Information If the V-PCC parameter track has an associated timed-metadata track with a sample entry type 'dyvw', source views defined for the MIV stream carried by the V-PCC parameter track are considered as dynamic views (i.e., the view information may dynamically change over time).

The associated timed-metadata track shall contain a 'cdsc' track reference to the V-PCC parameter track carrying the atlas stream.
Sample Entry

```
aligned (8) class DynamicViewSampleEntry extends
MetaDataSampleEntry ('dyvw') {
    VPCCViewsBox ( );
}
```

Sample Format Syntax

```
aligned (8) DynamicViewSample ( ) {
    unsigned int (16) num_views;
    for (i=0; i < num_views; i++)
        ViewInfoStruct (camera_parameters_included_flag);
    }
}
```

Semantics num_views indicates the number of views signalled in the sample. This may not necessarily be equal to the total number of available views. Only views whose view information is being updated are present in the sample.

ViewInfoStruct( ) is defined in the previous section of Embodiment 2. If camera_parameters_included_flag is set to 0, this implies that the camera parameters of the view have been previously signalled in a previous instance of a ViewInfoStruct with the same view_id, either in a previous sample or in the sample entry.

5.2 Example Embodiment 4

Examples of Encapsulation and Signalling in MPEG-DASH

V-PCC Descriptor

An EssentialProperty element with a @scheme IdUri attribute equal to "urn:mpeg:mpegI:vpcc:2019:vpc" is referred to as a VPCC descriptor. At most one VPCC descriptor may be present at the adaptation set level for the main AdaptationSet of the point cloud.

TABLE 3

Attributes for the VPCC descriptor

| Attributes for VPCC descriptor | Use | Data type | Description |
|---|---|---|---|
| vpcc:@pcId | CM | xs:string | An id for the point cloud. This attribute shall be present if multiple versions of the same point cloud are signalled in separate AdapatationSets. |
| vpcc:@viewIds | CM | xs:stringVectorType | A list of space separated identifiers for the views. This attribute shall be present if the V-PCC content correspond to one or more views of the volumetric visual media. |
| vpcc:@numLayers | O | xs:unsignedByte | The number of layers for the V-PCC stream. If @numLayers is not present, the default value is 1. |
| vpcc:@numTileGroups | O | xs:unsignedByte | Number of V-PCC tile groups in the V-PCC content. If @numTileGroups is not present, the default value is 1. |

Legend:
For attributes:
M = Mandatory,
O = Optional,
OD = Optional with Default Value, TABLE 3-continued Attributes for the VPCC descriptor

| Attributes for VPCC descriptor | Use | Data type | Description |
|---|---|---|---|

CM = Conditionally Mandatory.

For elements: <minOccurs> . . . <maxOccurs> (N = unbounded)

Elements are bold; attributes are non-bold and preceded with an @.

VPCCViews Descriptor

To identify the static views in the main AdaptationSet for the V-PCC content and their respective associated V-PCC tracks, a VPCCViews descriptor shall be used. A VPCCViews is an EssentialProperty or SupplementalProperty descriptor with the @schemeIdUri attribute equal to "urn:mpeg:mpegI:vpcc:2020:vpvw".

At most one single VPCCViews descriptor shall be present at the adaptation set level or the representation level in the main AdaptationSet or at the preselection level for the point cloud content.

The @value attribute of the VPCCViews descriptor shall not be present. The VPCCViews descriptor shall include elements and attributes as specified in Table 4.

TABLE 4

Elements and attributes for the VPCCViewGroups descriptor

| Elements and attributes for VPCCViewGroups descriptor | Use | Data type | Description |
|---|---|---|---|
| view | 0 . . . N | vpcc: viewGroupType | An element whose elments and attributes specify the view information for the volumetric visual media and its associated V-PCC tracks. |
| view@viewId | M | xs: unsignedByte | This attribute specifies the view identifier |
| view@viewGroupId | M | xs: unsignedByte | This attribute specifies the view group identifier |
| viewGroup.view@is_basic_View | O | xs: boolean | A flag indicating whether the view is selected as basic view. If not present, the default value is false. |
| view.cameralParameter | O | vpcc: cameraParameterType | An element whose attributes specify the real or virtual camera position and orientation information according to the view. |
| view.cameralParameter@cameraId | M | xs: unsignedByte | This attribute specifies the camera identifier |
| view.cameralParameter@camera_pos_x | M | xs: int | The x-coordinate value of the camera position in meters in the global reference coordinate system. The values shall be in units of $2^{-16}$ meters. |
| view.cameralParameter@camera_pos_y | M | xs: int | The y-coordinate value of the camera position in meters in the global reference coordinate system. The values shall be in units of $2^{-16}$ meters. |
| view.cameralParameter@camera_pos_z | M | xs: int | The z-coordinate value of the camera position in meters in the global reference coordinate system. The values shall be in units of $2^{-16}$ meters. |
| view.cameralParameter@camera_quat_x | M | xs: float | The x component of the orientation of the camera using the quaternion representation. |
| view.cameralParameter@camera_quat_y | M | xs: float | The y component of the orientation of the camera using the quaternion representation. |
| view.cameralParameter@camera_quat_z | M | xs: float | The z component of the orientation of the camera using the quaternion representation. |
| view.cameralParameter@camera_hor_range | M | omaf: HRange | The horizontal field of view of the viewing frustum associated with the camera. |
| view.cameralParameter@camera_ver_range | M | omaf: VRange | The vertical field of view of the viewing frustum associated with the camera. |
| view.cameralParameter@camera_near_depth | M | xs: int | The near depth (or distances) based on the near plane of the viewing frustum associated with the camera. The value shall be in units of $2^{-16}$ meters. |
| view.cameralParameter@camera_far_depth | M | xs: int | The far depth (or distances) based on the far plane of the viewing frustum associated with the camera. The value shall be in units of $2^{-16}$ meters. |
| view@vpccTrackIds | O | xs: StringVectorType | A list of space separated identifiers corresponding to the values of the track_id for a number of V-PCC tracks which carry atlas data for the view. |

Legend:
For attributes:
M = Mandatory,
O = Optional,
OD = Optional with Default Value,
CM = Conditionally Mandatory.
For elements: <minOccurs> . . . <maxOccurs> (N = unbounded)
Elements are bold; attributes are non-bold and preceded with an @.

Dynamic Views

When the views are dynamic, a timed-metadata track for signalling each view information in the presentation timeline shall be carried in a separate AdaptationSet with a single representation and associated (linked) with the main V-PCC track using the @association Id attribute, defined in ISO/IEC 23009-1 [MPEG-DASH], with a @associationType value that includes the 4CC 'vpcm' for the corresponding AdaptationSet or Representation.

Figure 4:
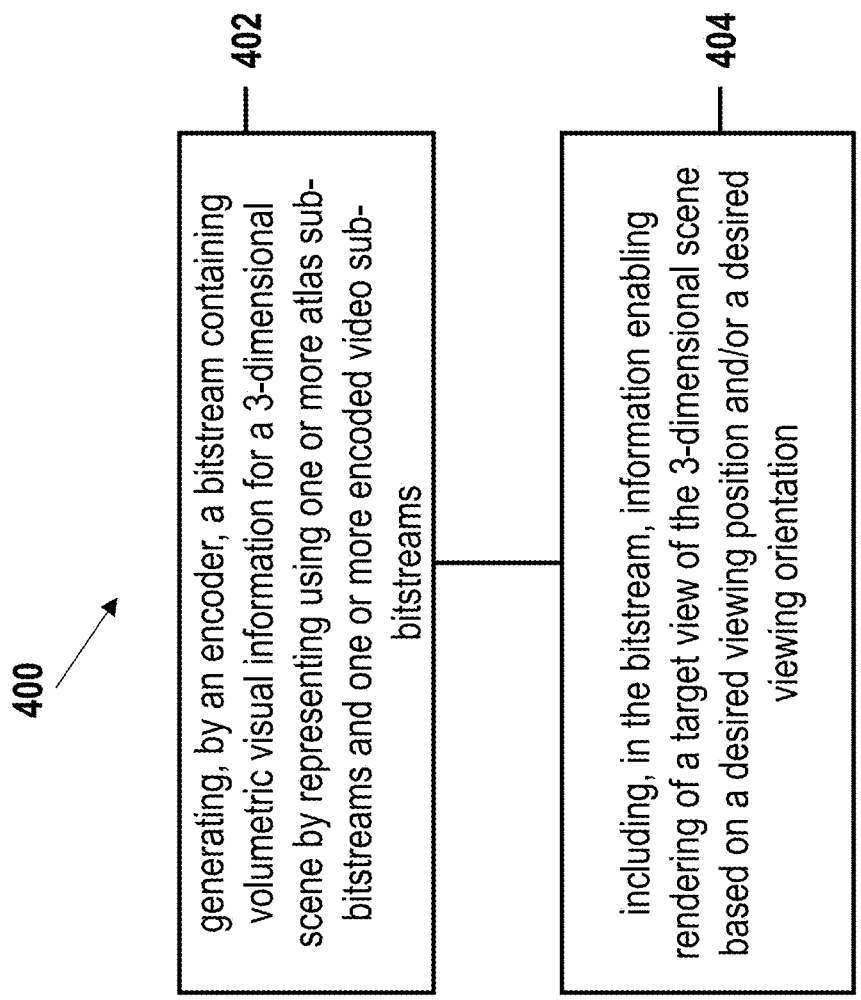
FIG. 4 is a flowchart of an example method of volumetric visual media processing.

FIG. 4 is a flowchart for an example method 400 of processing volumetric visual media data. As discussed throughout the present document, in some embodiments, volumetric visual media data may include point cloud data. In some embodiments, the volumetric visual media data may represent 3-D objects. The 3-D objects may be projected to 2-D surfaces and arranged into video frames. In some embodiments, the volumetric visual data may represent multi-view video data, and so on.

The method 400 may be implemented by an encoder apparatus, as further described in the present document. The method 400 includes, at 402, generating, by the encoder, a bitstream containing volumetric visual information for a 3-dimensional scene by representing using one or more atlas sub-bitstreams and one or more encoded video sub-bitstreams. The method 400 includes, at 404, adding, in the bitstream, information enabling rendering of a target view of the 3-dimensional scene based on a desired viewing position and/or a desired viewing orientation.

In some embodiments, the generating (402) may include encoding, by the encoder, an atlas group corresponding to a view group from which one or more views of the volumetric visual data are selectable been selected for the rendering of the target view. For example, the atlas group may refer to a group of atlases that is a group of atlas sub-streams in the bitstream.

In some embodiments the generating (402) includes encapsulating a group of volumetric visual tracks corresponding to the atlas group based on a syntax element of a volumetric visual parameter track in a file storage of the bitstream. In some embodiments, the group of volumetric visual tracks and the volumetric visual parameter track may be constructed to carry all the atlas data for the atlas group (using the corresponding atlas sub-streams). In some examples, the syntax element may be implemented using the view group info box (static or dynamic). For example, the static view group as described in Sections 4.1, or 5.1 may be used for such embodiments.

In some embodiments, the generating (402) includes, for encoding an atlas group, encapsulating a group of volumetric visual tracks corresponding to the atlas group based on a syntax element of a timed metadata track which contains a specific track reference to a volumetric visual parameter track in a file storage of the bitstream. Here, the group of volumetric visual tracks and the volumetric visual parameter track may carry all the atlas data for the atlas group. The specific track reference may be used by a decoder during the parsing/rendering operation as further described herein. This generation operation may use the dynamic view group described in the present document (e.g. Sections 4.1 or 5.1).

In some embodiments, the method 400 further includes adding, in the bitstream, information identifying the group of volumetric visual tracks according to a specific track group type and a specific track group identity, wherein each of volumetric visual tracks in the group of volumetric visual tracks contains a specific track reference to the volumetric visual parameter track.

In some embodiments, the method 400 further includes, encoding, by the encoder, the one or more views of a volumetric visual data for the target view based on one or more view group informations, wherein each view group information describes one or more views. In some embodiments, each view group information further includes camera parameters for the one or more views.

In some embodiments, the method 400 further includes encoding, by the decoder, one or more atlases corresponding to one or more views of a volumetric visual data selected for the target view.

In some embodiments, the information from the one or more atlas sub-stream is encoded by: encapsulating one or more volumetric visual tracks corresponding to the one or more atlases based on a syntax element (e.g., view info box syntax structure-static or dynamic) of a volumetric visual parameter track in a file storage syntax structure of the bitstream; wherein the one or more volumetric visual tracks and the volumetric visual parameter track carry all the atlas data for the one or more atlases.

In some embodiments, the information from the one or more atlas sub-stream is encoded by: encapsulating one or more volumetric visual tracks corresponding to the one or more atlases based on a syntax element (e.g., view information box syntax structure-static or dynamic) of a timed metadata track which contains a specific track reference to a volumetric visual parameter track in a file storage of the bitstream; wherein the one or more volumetric visual tracks and the volumetric visual parameter track carry all the atlas data for the one or more atlases.

In some embodiments, the method 400 includes adding to the bitstream information that identifies the one or more views of the volumetric visual data for rendering of the target view based on view information for the one or more views, wherein each view information describes camera parameters of a corresponding view.

In some embodiments, the method 400 includes including, in the bitstream, information for identifying the volumetric visual parameter track according to a specific sample entry type, wherein the volumetric visual parameter track corresponds to one or more volumetric visual tracks with a specific track reference, wherein the volumetric visual parameter track specifies constant parameter sets and common atlas data for all the referenced volumetric visual tracks with the specific track reference.

In some embodiments, the method 400 includes adding, in the bitstream, information for identifying the timed metadata track according to a specific sample entry type that indicates one or more views of a volumetric visual data selected for the target view rendering are dynamic.

Figure 5:
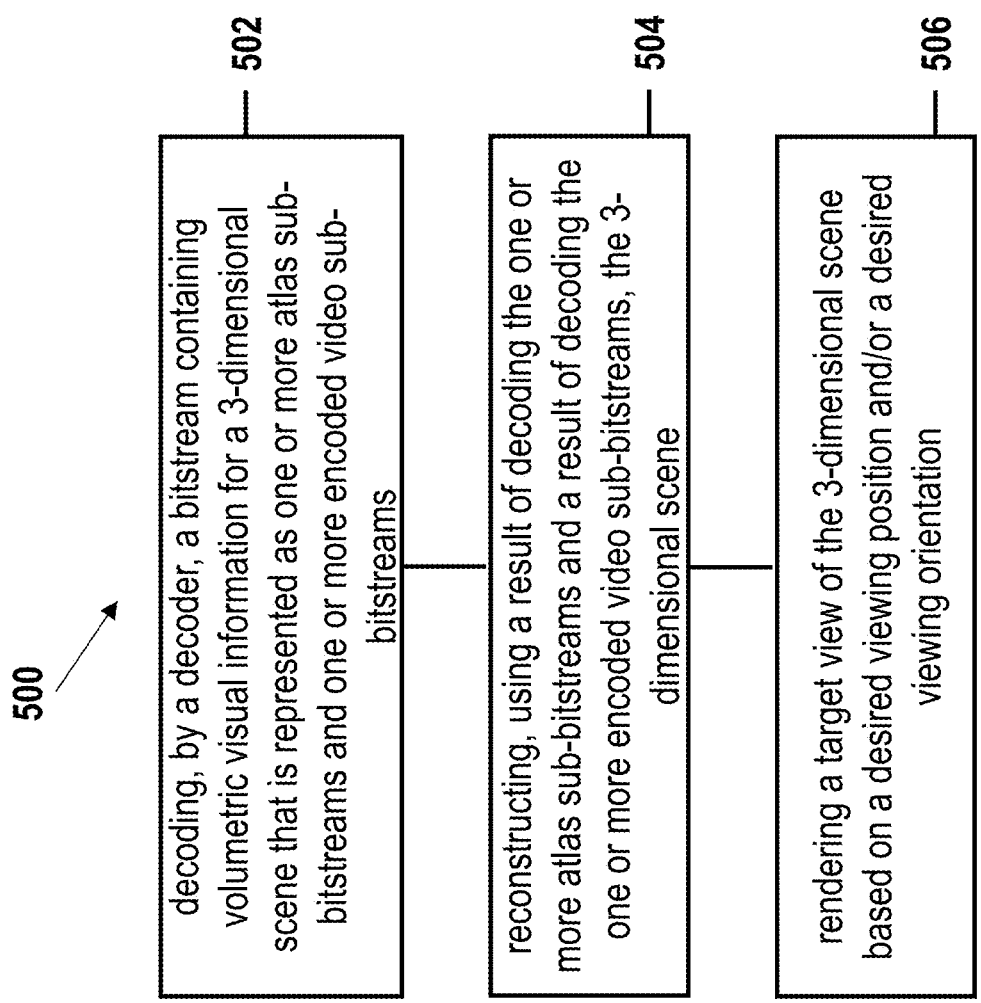
FIG. 5 is a flowchart of an example method of volumetric visual media processing.

The encoded video sub-streams may include: one or more video-coded elementary streams for geometry data, and zero or one video-coded elementary stream for occupancy map data, and zero or more video-coded elementary streams for attribute data, wherein the geometry data, the occupancy map data and the attribute data are descriptive of the 3-dimensional scene FIG. 5 is a flowchart for an example method 500 of processing volumetric visual media data. The method 500 may be implemented by a decoder. Various terms used in describing syntax elements in the method 500 are similar to the terms used above for syntax elements describing the encoder-side method 400.

The method 500 includes, at 502, decoding, by a decoder, a bitstream containing volumetric visual information for a 3-dimensional scene that is represented as one or more atlas sub-bitstreams and one or more encoded video sub-bitstreams. The method 500 includes, at 504, reconstructing, using a result of decoding the one or more atlas sub-bitstreams and a result of decoding the one or more encoded video sub-bitstreams, the 3-dimensional scene.

The method 500 includes, at 506, rendering a target view of the 3-dimensional scene based on a desired viewing position and/or a desired viewing orientation. In some embodiments, the decoding and reconstructing may be performed by a first hardware platform while the rendering may be performed by another hardware platform that works together with the decoding hardware platform. In other words, the first hardware platform may only perform steps 502 and 504, as described above to implement a method of reconstruction of a 3-dimensional scene. In some embodiments, the decoder may receive a desired viewing position or a desired viewing orientation of a viewer in an x-y-z or a polar coordinate system. From this information, the decoder may create a target view that is aligned with the viewer's position/orientation from decoded sub-bitstreams that include video information using decoded sub-bitstreams of atlas that corresponds to a view group that is used for generating the target view.

In some embodiments, the reconstructing comprises: decoding, by the decoder, an atlas group corresponding to a view group from which one or more views of the volumetric visual data have been selected for the rendering of the target view.

In some embodiments, the decoding includes, before the decoding the atlas group: decapsulating, by a file parser, a group of volumetric visual tracks corresponding to the atlas group based on a syntax element of a volumetric visual parameter track in a file storage of the bitstream, wherein the group of volumetric visual tracks and the volumetric visual parameter track carry all the atlas data for the atlas group.

In some embodiments, the decoding includes, before the decoding of an atlas group, comprising: decapsulating, by a file parser, a group of volumetric visual tracks corresponding to the atlas group based on a syntax element of a timed metadata track which contains a specific track reference to a volumetric visual parameter track in a file storage of the bitstream; wherein the group of volumetric visual tracks and the volumetric visual parameter track carry all the atlas data for the atlas group. For example, the Dynamic view group structure described in the present document may be used during this operation.

In some embodiments, the method 500 further includes identifying the group of volumetric visual tracks according to a specific track group type and a specific track group identity, wherein each of volumetric visual tracks in the group of volumetric visual tracks contains a specific track reference to the volumetric visual parameter track.

In some embodiments, the method 500 further includes selecting, by the decoder, the one or more views of a volumetric visual data for the target view based on one or more view group informations, wherein each view group information describes one or more views.

In some embodiments, each view group information further includes camera parameters for the one or more views.

In some embodiments, the method further includes decoding, by the decoder, one or more atlases corresponding to one or more views of a volumetric visual data selected for the target view.

In some embodiments, the information from the one or more atlas sub-stream is decoded by: decapsulating one or more volumetric visual tracks corresponding to the one or more atlases based on a syntax element (e.g., ViewInfoBox element) of a volumetric visual parameter track in a file storage syntax structure of the bitstream; wherein the one or more volumetric visual tracks and the volumetric visual parameter track carry all the atlas data for the one or more atlases.

In some embodiments, the information from the one or more atlas sub-stream is decoded by: decapsulating one or more volumetric visual tracks corresponding to the one or more atlases based on a syntax element of a timed metadata track which contains a specific track reference to a volumetric visual parameter track in a file storage of the bitstream; wherein the one or more volumetric visual tracks and the volumetric visual parameter track carry all the atlas data for the one or more atlases.

In some embodiments, the method further includes selecting, by the decoder, the one or more views of the volumetric visual data for rendering of the target view based on view information for the one or more views, wherein each view information describes camera parameters of a corresponding view.

In some embodiments, the method 500 further includes identifying the volumetric visual parameter track according to a specific sample entry type, wherein the volumetric visual parameter track corresponds to one or more volumetric visual tracks with a specific track reference, wherein the volumetric visual parameter track specifies constant parameter sets and common atlas data for all the referenced volumetric visual tracks with the specific track reference.

In some embodiments, the method 500 further includes identifying the timed metadata track according to a specific sample entry type that indicates one or more views of a volumetric visual data selected for the target view rendering are dynamic.

In some embodiments, the one or more encoded video sub-bitstreams include: one or more video-coded elementary streams for geometry data, and zero or one video-coded elementary stream for occupancy map data, and zero or more video-coded elementary streams for attribute data, wherein the geometry data, the occupancy map data and the attribute data are descriptive of the 3-dimensional scene.

With reference to FIGS. 4-5, in some embodiments, an atlas group may refer to a group of atlas sub-streams. In some embodiments, the group of volumetric visual tracks used by the above-discussed methods may represent a volumetric visual track group.

In some embodiments, in the method 400 or 500, the syntax element of the volumetric visual parameter track may be the ViewGroupInfoBox syntax structure described in the present document.

Figure 6:
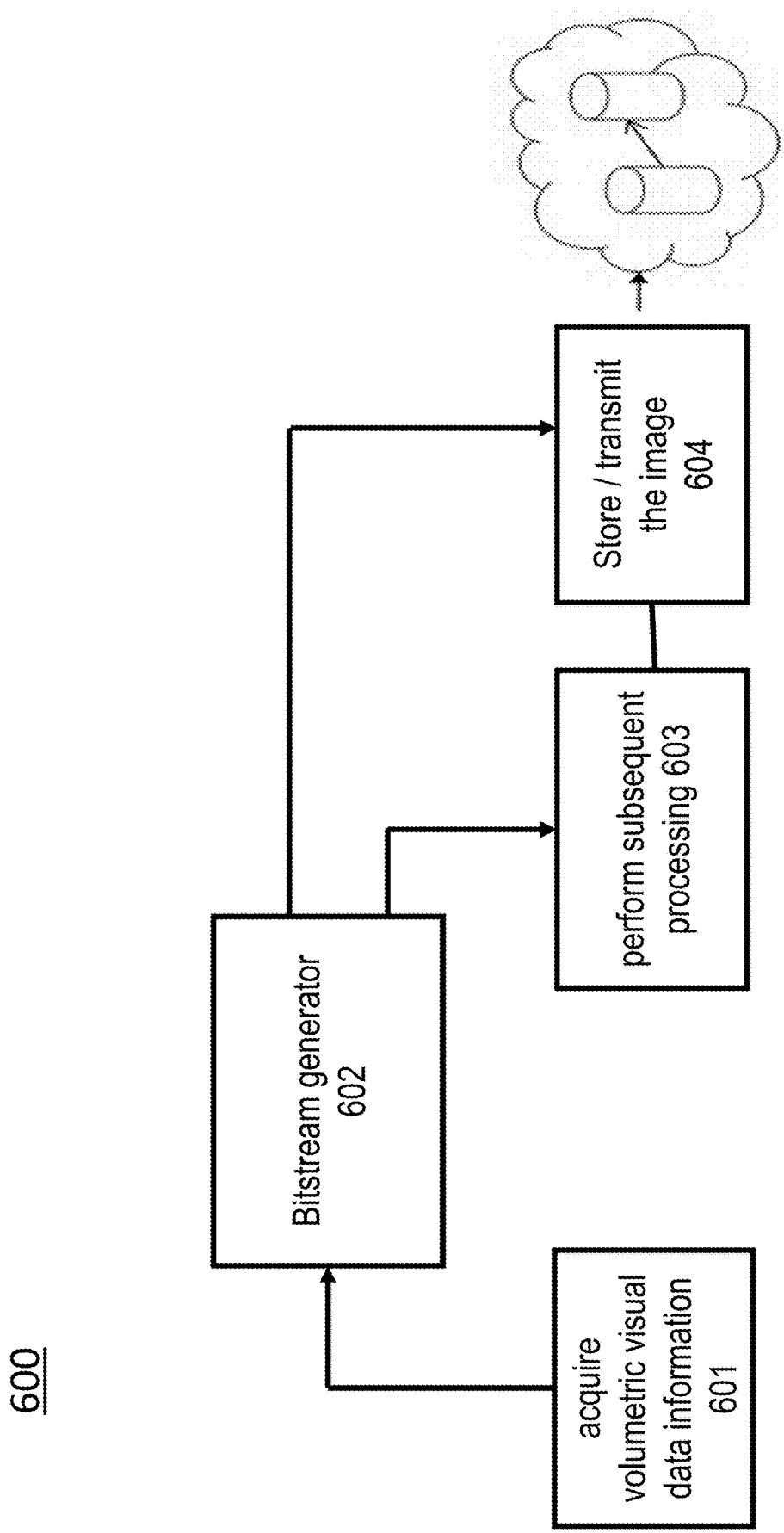
FIG. 6 is a block diagram of an example of a volumetric visual media data encoding apparatus in accordance with the present technology.

FIG. 6 is a block diagram of an example of an apparatus 600 that may be an encoder of volumetric media data in accordance with the present technology. The apparatus 600 includes an acquiring module 601 that is configured to collect 3-dimensional scenes and volumetric visual media information in the form of point cloud data or multi-view video data, or multi-surface projections, and so on. This module may include input-output controller circuitry for reading video data from memory or from a camera frame buffer. This module may include processor executable instructions for reading volumetric data. The apparatus 600 includes a bitstream generator module 602 that is configured to generate a bitstream that is an encoded representation of the volumetric visual information according to various techniques described herein (e.g., method 400). This module may be implemented as processor executable software code. The apparatus 600 also includes a module 603 configured to perform subsequent processing on the bitstream (e.g., metadata insertion, encryption, etc.). The apparatus further includes a store/transmission module 904 is configured to perform either storage or network transmission layer coding on the video encoded data or the media data. The module 604 may implement, for example, the MPEG-DASH techniques described in the present document for streaming data over a digital communication network or storing the bitstream in a DASH compatible format.

The above-described modules 601-604 can be implemented by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The apparatus 600 as shown in FIG. 6 may be a device in a video application, such as a mobile phone, a computer, a server, a set top box, a portable mobile terminal, a digital video camera, a television broadcast system device, or the like.

Figure 7:
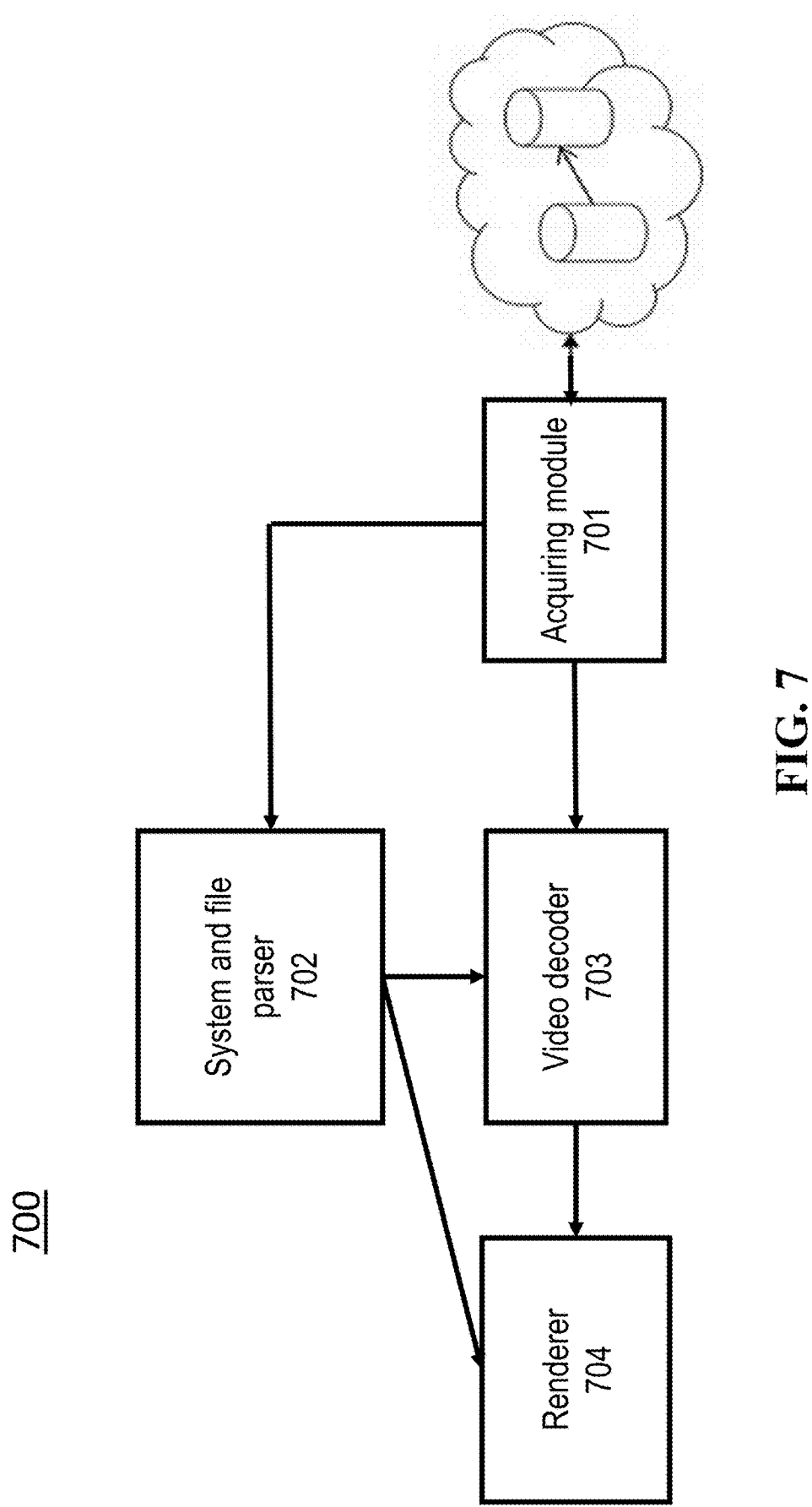
FIG. 7 is a block diagram of an example of a volumetric visual media data processing apparatus in accordance with the present technology.

FIG. 7 is a block diagram of an example of an apparatus 700 in accordance with the present technology. The apparatus 700 includes an acquiring module 701 that is configured to acquire the bitstream from the network or by reading from a storage device. For example the module 701 may implement parsing and extraction of a media file coded using the MPEG-DASH techniques described in the present document and perform decoding from network transmission layer data including volumetric visual media data. The system and file parser module 702 may extract various system layer and file layer syntax elements (e.g., atlas sub-bitstreams, group information, etc.) from the received bitstream. The video decoder 703 is configured to decode the encoded video sub-bitstreams that include media data for the 3-dimensional scene or the volumetric media data such as point cloud data or multi-view video data, and so on. The renderer module 704 is configured to render a target view of the three dimensional scene bases on a desired viewing position or a desired viewing orientation that it may receive from a user via a user interface control.

The above-described modules 701-704 can be realized by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The device as shown in FIG. 7 may be a device in a video application, such as a mobile phone, a computer, a server, a set top box, a portable mobile terminal, a digital video camera, a television broadcast system device, or the like.

Figure 8:
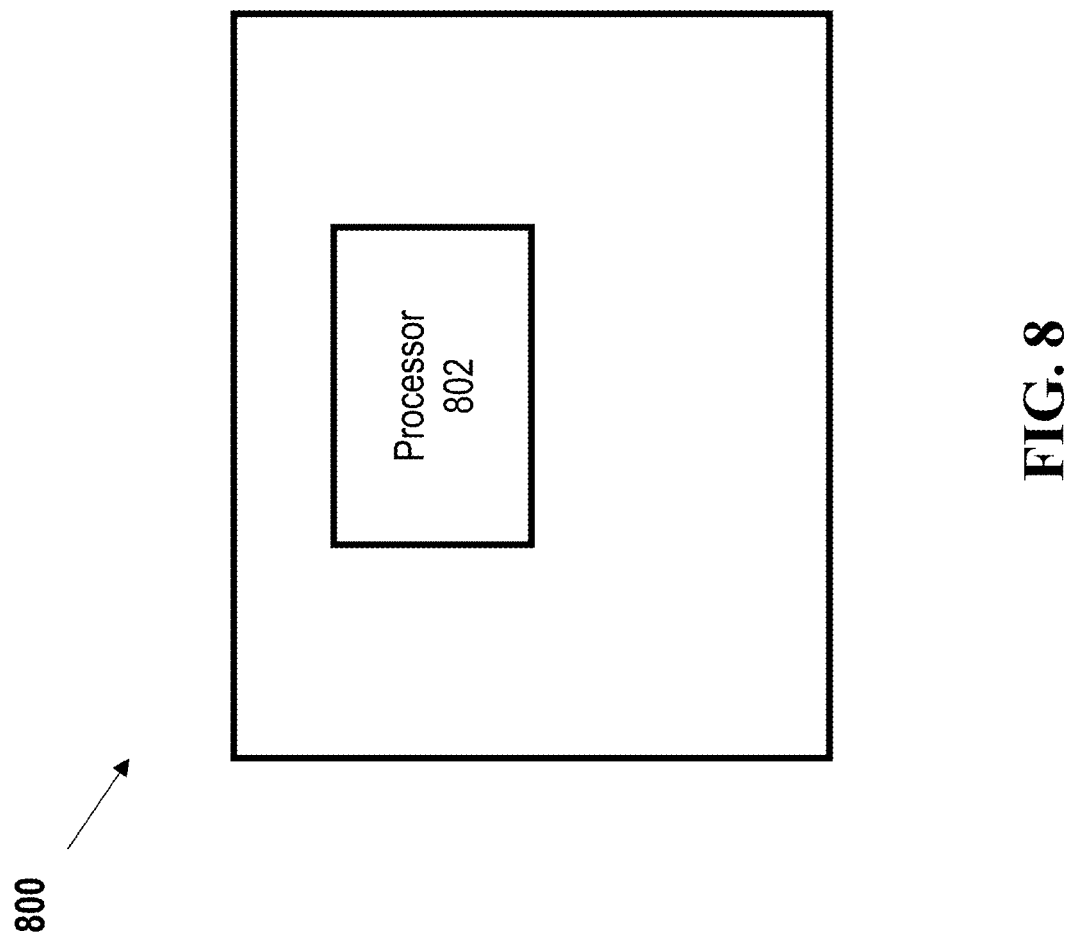
FIG. 8 is a block diagram of a hardware platform for implementing a volumetric visual media processing method described herein.

FIG. 8 is a block diagram of an example of an apparatus 800 that may be used as a hardware platform for implementing the various encoding and/or decoding functionalities described herein, including the encoder/decoder implementations described in FIGS. 6-7. The apparatus 800 includes a processor 802 that is programmed to implement a method described in the present document. The apparatus 800 may further include dedicated hardware circuitry for performing specific functions such as bitstream encoding or decoding. The apparatus 800 may also include a memory that stores executable code for the processor and/or volumetric data and other data, including data complying with the various syntax elements described in the present document.

In some embodiments, a 3D point cloud data encoder may be implemented to generate a bitstream representation of a 3D point cloud by encoding the 3D spatial information using the syntax and semantics as described in the present document.

The volumetric visual media data encoding or decoding apparatus may be implemented as a part of a computer, a user device such as a laptop, a tablet or a gaming device.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of volumetric visual data processing, comprising:
    decoding, by a decoder, a bitstream containing volumetric visual information for a 3-dimensional scene that is represented as one or more atlas sub-bitstreams and one or more encoded video sub-bitstreams;
    reconstructing, using a result of decoding the one or more atlas sub-bitstreams and a result of decoding the one or more encoded video sub-bitstreams, the 3-dimensional scene; and
    rendering a target view of the 3-dimensional scene based on a desired viewing position and/or a desired viewing orientation, and
    wherein the decoding of the bitstream includes:
    decapsulating a group of volumetric visual tracks corresponding to an atlas group based on a first syntax element of a volumetric visual parameter track identified according to a first sample entry type, the atlas group including all atlases generated from a same view group from which one or more views of a volumetric visual data have been selected for the rendering of the target view; and
    decoding the atlas group corresponding to the same view group, and
    wherein each of volumetric visual tracks in the group of volumetric visual tracks is associated with a second syntax element with a track group type equal to a certain value indicating that a corresponding volumetric visual track belongs to the group of volumetric visual tracks that correspond to the atlas group.

2. The method according to claim 1, wherein
    the atlas group corresponds to the same view group from which the one or more views of the volumetric visual data have been selected for the rendering of the target view.

3. The method according to claim 2, wherein the decapsulating of the group of volumetric visual tracks corresponding to the atlas group is performed before the decoding the atlas group, and
    wherein the group of volumetric visual tracks and the volumetric visual parameter track carry all atlas data for the atlas group.

4. The method according to claim 3, further comprising:
    identifying the group of volumetric visual tracks according to a specific track group type and a specific track group identity, wherein each of volumetric visual tracks in the group of volumetric visual tracks contains a specific track reference to the volumetric visual parameter track.

5. The method according to claim 2, further comprising:
    selecting, by the decoder, the one or more views of the volumetric visual data for the target view based on one or more view group information, wherein each view group information describes one or more views, wherein each view group information further includes camera parameters for the one or more views.

6. The method according to claim 1, wherein
    wherein the group of volumetric visual tracks and the volumetric visual parameter track carry all atlas data for the atlas group.

7. The method according to claim 2, further comprising:
    selecting, by the decoder, the one or more views of the volumetric visual data for rendering of the target view based on view information for the one or more views, wherein each view information describes camera parameters of a corresponding view.

8. The method according to claim 3, further comprising:
    identifying the volumetric visual parameter track according to the first sample entry type, wherein the volumetric visual parameter track specifies constant parameter sets and common atlas data for all referenced volumetric visual tracks with a specific track reference.

9. The method of claim 3, further comprising:
    identifying a timed metadata track according to a second sample entry type that indicates the one or more views of the volumetric visual data selected for the rendering of the target view are dynamic.

10. The method according to claim 1, wherein the one or more encoded video sub-bitstreams include at least one of:
    one or more video-coded elementary streams for geometry data, zero or one video-coded elementary stream for occupancy map data, or
    zero or more video-coded elementary streams for attribute data, wherein the geometry data, the occupancy map data and the attribute data are descriptive of the 3-dimensional scene.

11. A method of volumetric visual data processing, comprising:
    generating, by an encoder, a bitstream containing volumetric visual information for a 3-dimensional scene by representing the 3-dimensional scene using one or more atlas sub-bitstreams and one or more encoded video sub-bitstreams, and
    including, in the bitstream, information enabling rendering of a target view of the 3-dimensional scene based on a desired viewing position and/or a desired viewing orientation,
    wherein the generating comprises:
    encoding, by the encoder, an atlas group corresponding to a view group from which one or more views of a volumetric visual data are selectable has been selected for the rendering of the target view, the atlas group including all atlases generated from the view group;
    encapsulating a group of volumetric visual tracks corresponding to the atlas group based on a first syntax element of a volumetric visual parameter track identified according to a first sample entry type, and
    wherein each of volumetric visual tracks in the group of volumetric visual tracks is associated with a second syntax element with a track group type equal to a certain value indicating that a corresponding volumetric visual track belongs to the group of volumetric visual tracks that correspond to the atlas group.

12. The method according to claim 11,
wherein the group of volumetric visual tracks and the volumetric visual parameter track carry all atlas data for the atlas group.

13. The method according to claim 12, further comprising:
including, in the bitstream, information identifying the group of volumetric visual tracks according to a specific track group type and a specific track group identity, wherein each of volumetric visual tracks in the group of volumetric visual tracks contains a specific track reference to the volumetric visual parameter track.

14. The method according to claim 11,
wherein the one or more views of the volumetric visual data for the target view are encoded based on one or more view group information, wherein each view group information describes one or more views, wherein each view group information further includes camera parameters for the one or more views.

15. The method according to claim 11, further comprising:
including information that identifies the one or more views of the volumetric visual data for rendering of the target view based on view information for the one or more views, wherein the view information describes camera parameters of a corresponding view.

16. The method according to claim 12, further comprising:
including, in the bitstream, information for identifying the volumetric visual parameter track according to the first sample entry type, wherein the volumetric visual parameter track specifies constant parameter sets and common atlas data for all referenced volumetric visual tracks with a specific track reference.

17. The method of claim 12, further comprising:
including, in the bitstream, information for identifying a timed metadata track according to a second sample entry type that indicates the one or more views of the volumetric visual data selected for the rendering of the target view are dynamic.

18. The method according to claim 11, wherein the one or more encoded video sub-bitstreams include at least one of:
one or more video-coded elementary streams for geometry data, zero or one video-coded elementary stream for occupancy map data, or
zero or more video-coded elementary streams for attribute data, wherein the geometry data, the occupancy map data and the attribute data are descriptive of the 3-dimensional scene.

19. A communication apparatus comprising a processor configured to:
decode a bitstream containing volumetric visual information for a 3-dimensional scene that is represented as one or more atlas sub-bitstreams and one or more encoded video sub-bitstreams;
reconstruct, using a result of decoding the one or more atlas sub-bitstreams and a result of decoding the one or more encoded video sub-bitstreams, the 3-dimensional scene; and
render a target view of the 3-dimensional scene based on a desired viewing position and/or a desired viewing orientation, and
wherein the decoding of the bitstream includes:
decapsulating a group of volumetric visual tracks corresponding to an atlas group based on a first syntax element of a volumetric visual parameter track identified according to a first sample entry type, the atlas group including all atlases generated from a same view group from which one or more views of a volumetric visual data have been selected for the rendering of the target view; and
decoding the atlas group corresponding to the same view group, and
wherein each of volumetric visual tracks in the group of volumetric visual tracks is associated with a second syntax element with a track group type equal to a certain value indicating that a corresponding volumetric visual track belongs to the group of volumetric visual tracks that correspond to the atlas group.

20. A communication apparatus comprising a processor configured to:
generate a bitstream containing volumetric visual information for a 3-dimensional scene by representing the 3-dimensional scene using one or more atlas sub-bitstreams and one or more encoded video sub-bitstreams, and
include, in the bitstream, information enabling rendering of a target view of the 3-dimensional scene based on a desired viewing position and/or a desired viewing orientation,
wherein the generating of the bitstream comprises:
encoding an atlas group corresponding to a view group from which one or more views of a volumetric visual data are selectable has been selected for the rendering of the target view, the atlas group including all atlases generated from the view group;
encapsulating a group of volumetric visual tracks corresponding to the atlas group based on a first syntax element of a volumetric visual parameter track identified according to a first sample entry type, and
wherein each of volumetric visual tracks in the group of volumetric visual tracks is associated with a second syntax element with a track group type equal to a certain value indicating that a corresponding volumetric visual track belongs to the group of volumetric visual tracks that correspond to the atlas group.

* * * * *